(12) United States Patent
Rogers

(10) Patent No.: US 6,929,020 B1
(45) Date of Patent: Aug. 16, 2005

(54) FLUID PRESSURE RELEASING SYSTEM AND METHOD

(75) Inventor: Theodore A. Rogers, Long Beach, CA (US)

(73) Assignee: Klune Industries, Inc., North Hollywood, CA (US)

( * ) Notice: Subject to any disclaimer, the term of this patent is extended or adjusted under 35 U.S.C. 154(b) by 321 days.

(21) Appl. No.: 10/079,947

(22) Filed: Feb. 19, 2002

(51) Int. Cl.$^7$ .............................................. F16K 15/20
(52) U.S. Cl. ...................... 137/223; 137/232; 137/596; 137/625.33; 152/428; 251/215
(58) Field of Search ................................. 137/223, 228, 137/232, 596, 625.32, 625.3, 625.33, 625.37, 137/625.38; 152/415, 427, 428; 251/215

(56) References Cited

U.S. PATENT DOCUMENTS

| | | | | |
|---|---|---|---|---|
| 191,860 | A | * | 6/1877 | Jones .......................... 251/215 |
| 285,955 | A | * | 10/1883 | Barry ..................... 137/625.37 |
| 549,603 | A | * | 11/1895 | Jeffery ......................... 152/427 |
| 566,811 | A | * | 9/1896 | Schindel ..................... 137/223 |
| 1,617,333 | A | * | 2/1927 | Hutchings ................... 251/215 |
| 2,195,069 | A | * | 3/1940 | Arbogast ............... 137/625.37 |
| 2,451,277 | A | * | 10/1948 | Crowley ..................... 152/415 |
| 2,473,912 | A | * | 6/1949 | Schwinn ..................... 137/223 |
| 2,828,050 | A | * | 3/1958 | Engelder ..................... 137/596 |
| 2,987,071 | A | | 6/1961 | Haus |
| 3,450,147 | A | | 6/1969 | Webb |
| 3,875,961 | A | * | 4/1975 | Gibbens ...................... 137/223 |
| 4,146,053 | A | * | 3/1979 | Corrigan ..................... 137/596 |
| 4,153,096 | A | | 5/1979 | Kirk |
| 4,444,220 | A | * | 4/1984 | Seger .......................... 137/312 |
| 5,203,831 | A | * | 4/1993 | Lind et al. ................... 137/223 |
| 5,295,504 | A | | 3/1994 | Riquier et al. |
| 5,398,744 | A | | 3/1995 | Street et al. |
| 5,741,103 | A | | 4/1998 | Lee |
| 5,853,021 | A | | 12/1998 | Grimes |
| 5,954,081 | A | | 9/1999 | Everhard et al. |

OTHER PUBLICATIONS

Ecological 4 Wheeling Adventures by Harry Lewellyn—Website: Airing Down-Tire Deflation Methods, Ecological 4-Wheeling Adventures (www.4x4now.com/sf0597.htm) pp. 1-6—printout dated Jul. 31, 2001 @8:32.
Air'em Down! Back to Tire Delator Main Page by TXJEEPER—Website: Rockcawler.com (Currie Tire Deflator) (www.rockcrawler.com/techreports/curriedeflator/currie2.html) p. 1-2—printout dated Jul. 31, 2001 @8:27.
Air'em Down! Back to Tire Delator Main Page by TXJEEPER—Website: Rockcawler.com (Currie tire Deflator) (www.rockcrawler.com/techreports/curriedeflator/currie2.html) p. 1 of 1—printout dated Jul. 31, 2001 @8:30.
Website: X2REVIEW.com: Trailhead Automatic Tired Deflators from Oasis Off Road Manufacturing—Oooh, the pressure! By Rick Webster (www.4x4review.com/products/accessories/oasis.asp) pp. 1-4—printout dated Jul. 31, 2001.

* cited by examiner

*Primary Examiner*—John Rivell
(74) *Attorney, Agent, or Firm*—Fulwider Patton Lee & Utecht, LLP

(57) ABSTRACT

A system and method for enabling rapid and controlled releasing of fluid pressure, as for deflating a tire. The system, in an embodiment thereof, enables rapid and controlled deflation of a tire to enable a vehicle to navigate in rough or unstable terrain.

1 Claim, 3 Drawing Sheets

US 6,929,020 B1

FLUID PRESSURE RELEASING SYSTEM AND METHOD

BACKGROUND OF THE INVENTION

1. Field of the Invention

The present invention relates generally to improvements in fluid pressure releasing systems and methods. In particular, it relates to a new and improved system and method for rapidly and controllably releasing fluid pressure.

2. Description of the Related Art

The systems and methods of the present invention are particularly useful for enabling the reduction of the air pressure in a tire.

A variety of systems and methods have been developed over the years for deflating a tire. Rapid and controlled reduction of tire air pressure enables the tire to provide a larger contact area on a road or trail surface and/or to substantially improve traction for navigating over rough or unstable terrain. Tire deflation, for example from a common tire pressure such as 30 pounds per square inch (psi) used on paved roads, to a substantially lower tire pressure such as 12 psi or 9 psi, is desired for enabling efficient and effective vehicle navigation in rough terrain. It is utilized in the military for military vehicles when having to move from relatively smooth surfaces to rough terrain, and is also utilized in the same manner for off-roading for vehicles such as cars, trucks, and/or sport utility vehicles, and for tractors and vehicles for forestry, construction, power line and pipeline maintenance, agricultural uses, and the like.

The various systems and methods developed for tire deflation to reduce tire air pressure include, for example, depressing the pin head in the air valve in the tire, by hand or by use of a depression device which may be pressed, clipped, or threaded onto the valve system, allowing the air to escape. Deflation to a desired pressure in such systems relies on alternately releasing air and checking pressure with a gauge, or on an integral pressure gauge intended to stop releasing air at a preset pressure. In other such systems, the valve core may be removed or held outside the valve by a tool, the air pressure may be released, and the cap may be replaced on the valve or the valve core replaced after releasing the desired amount of air. Further, a chuck, connected through a tube to a fitting attached to the valve, or attached directly to the valve, may be activated to release air from the tire. Also, a deflator fitting may be attached to the valve, to enable tire deflation. Another device is secured to the air valve, and releases pressure as the vehicle is driven, to a preset lower pressure.

However, there have been problems associated with such systems and methods. They are relatively slow, with substantial deflation times required which exceed desired times for military applications where speed is essential, and also for non-military uses where speed is desirable. Further, some such systems include installed deflators that project substantially from the valve stem, creating a risk of total deflation if the deflator is snagged on trail debris and any part of the deflator or valve stem is then damaged or detached. Other such systems require resetting and recalibration of the deflator if a different final pressure is desired. Still other such systems may be unsafe, with potential pressurized projection of the valve core or fittings resulting from sudden release of air pressure, and may be subjected to damage from rocks picked up while driving through the rough terrain.

Therefore, the present invention provides improved systems and methods for enabling the rapid and controlled release of fluid pressure, as for metered deflation of a tire for reducing tire air pressure in a safe manner. The inventions disclosed herein satisfy these and other needs.

SUMMARY OF THE INVENTION

The present invention, in general, provides a new and improved system and method for enabling the rapid and controlled release of fluid pressure, as for reducing tire air pressure.

More particularly, for example, in an embodiment of the present invention, a system is provided for providing for the efficient and effective deflation of a tire. The tire deflation system is usable in connection with a tire air valve which includes a valve stem which is extendable through a wheel rim, wherein the stem includes an extendable portion which is adapted to be extendable outside and adjacent the wheel rim. The tire deflation article includes multiple openings, formed in the extendable portion of the valve stem, and an external element, which is extendable about the openings in the extendable portion of the valve stem. The external element is securable in position relative to the extendable portion of the valve stem so as to cover the openings, and is movable so as to uncover the openings for enabling deflation of the tire. The covering of the openings by the external element prevents air from being released from the tire, while the uncovering of the openings fully or partially by the external element enables the safe and effective rapid and controlled release of air from the tire for deflation, so as to reduce the air pressure therein.

The above objects and advantages of the present invention, as well as others, are described in greater detail in the following description, when taken in conjunction with the accompanying drawings of illustrative embodiments.

DETAILED DESCRIPTION OF THE PREFERRED EMBODIMENTS

The present invention is directed to an improved system and method for enabling the rapid and controlled release of fluid pressure, as for the deflation of a tire to reduce tire air pressure in an efficient and effective manner. The preferred embodiments of the improved system and method are illustrated and described herein by way of example only and not by way of limitation.

Figure 1:
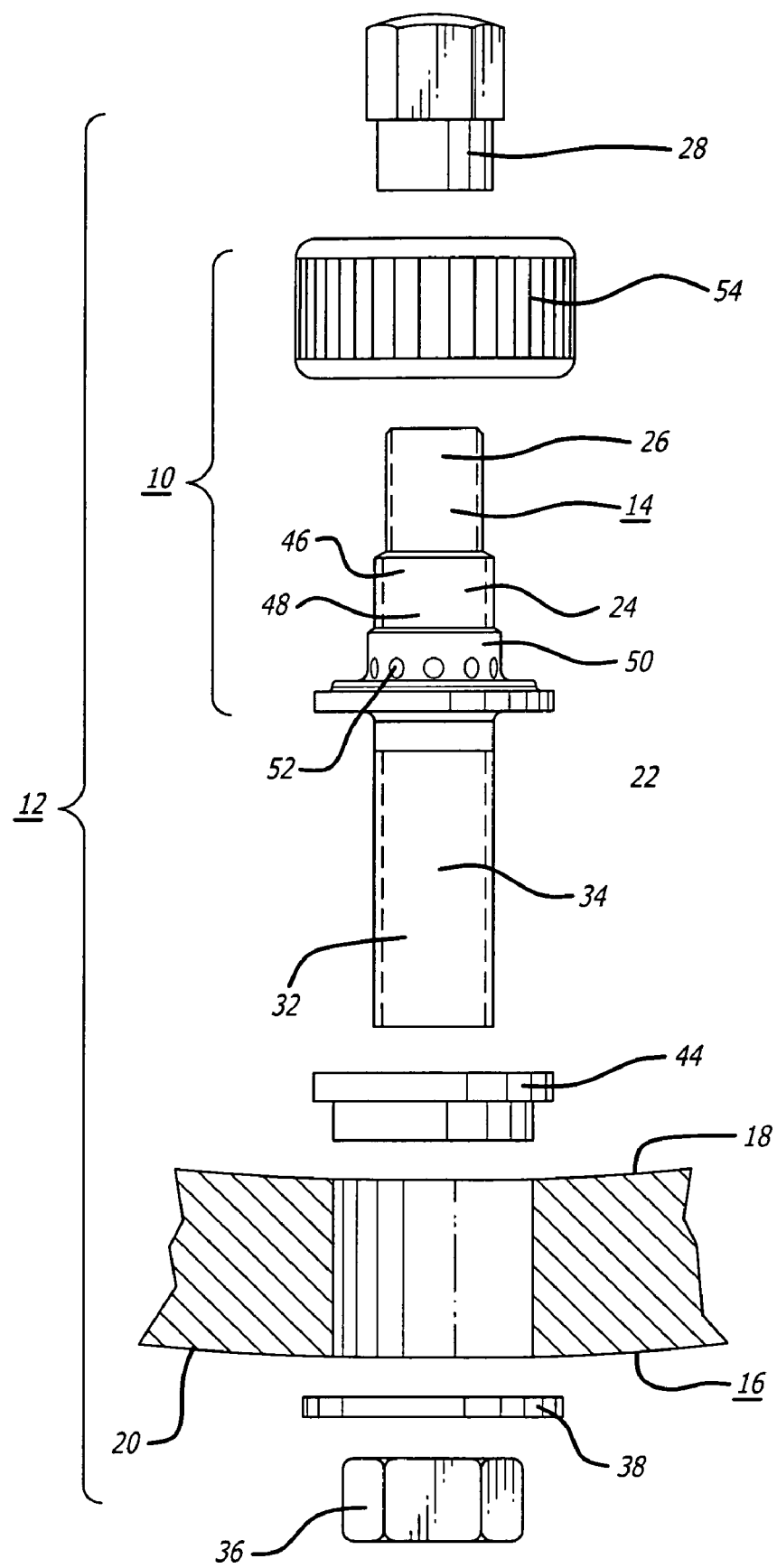
FIG. 1 is an exploded elevational partly-fragmentary partly-sectional view of a system in accordance with an embodiment of the present invention.
Figure 5:
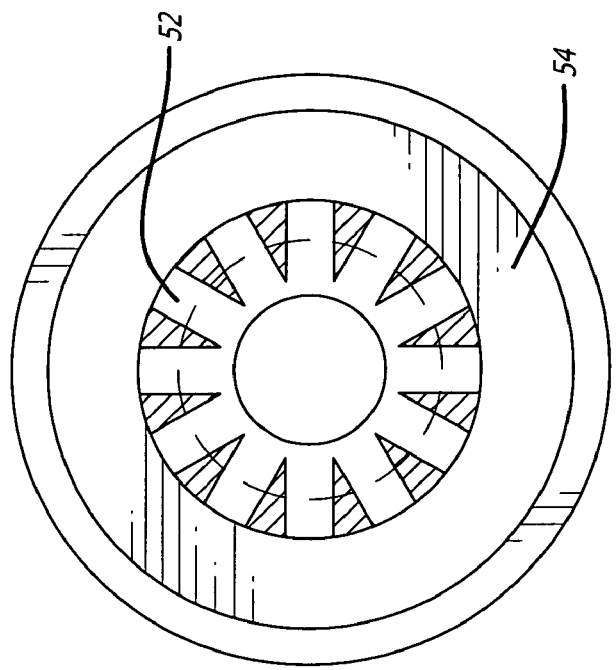
FIG. 5 is a top plan partly sectional view of the openings in the system, facing the centerline of the wheel, pursuant to the invention.
Figure 2:
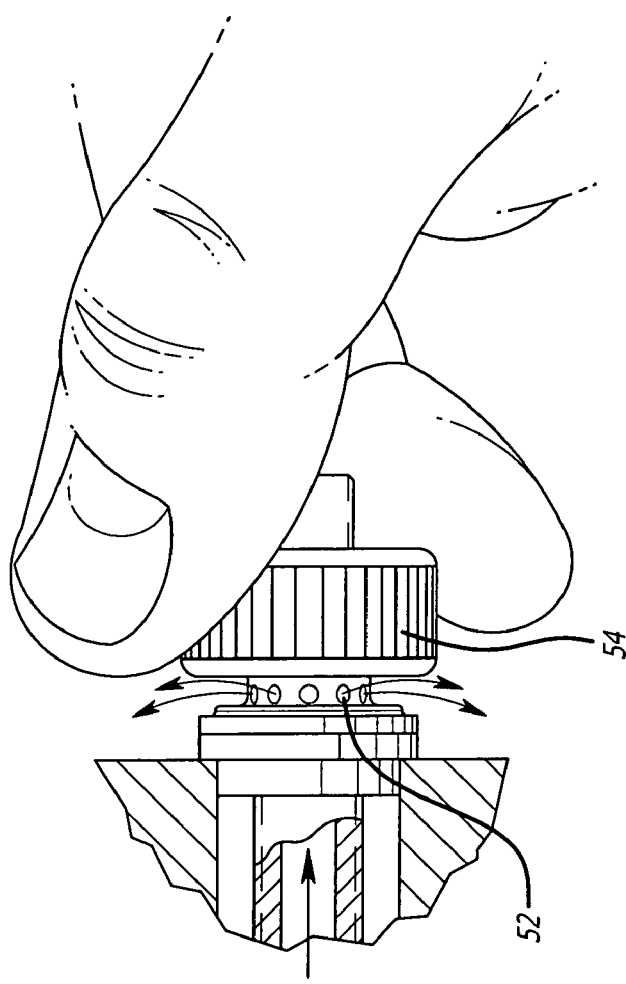
FIG. 2 is an elevational partly-fragmentary view of the uncovering of the openings in the system in FIG. 1 pursuant to an embodiment of the invention.
Figures 3, 4:
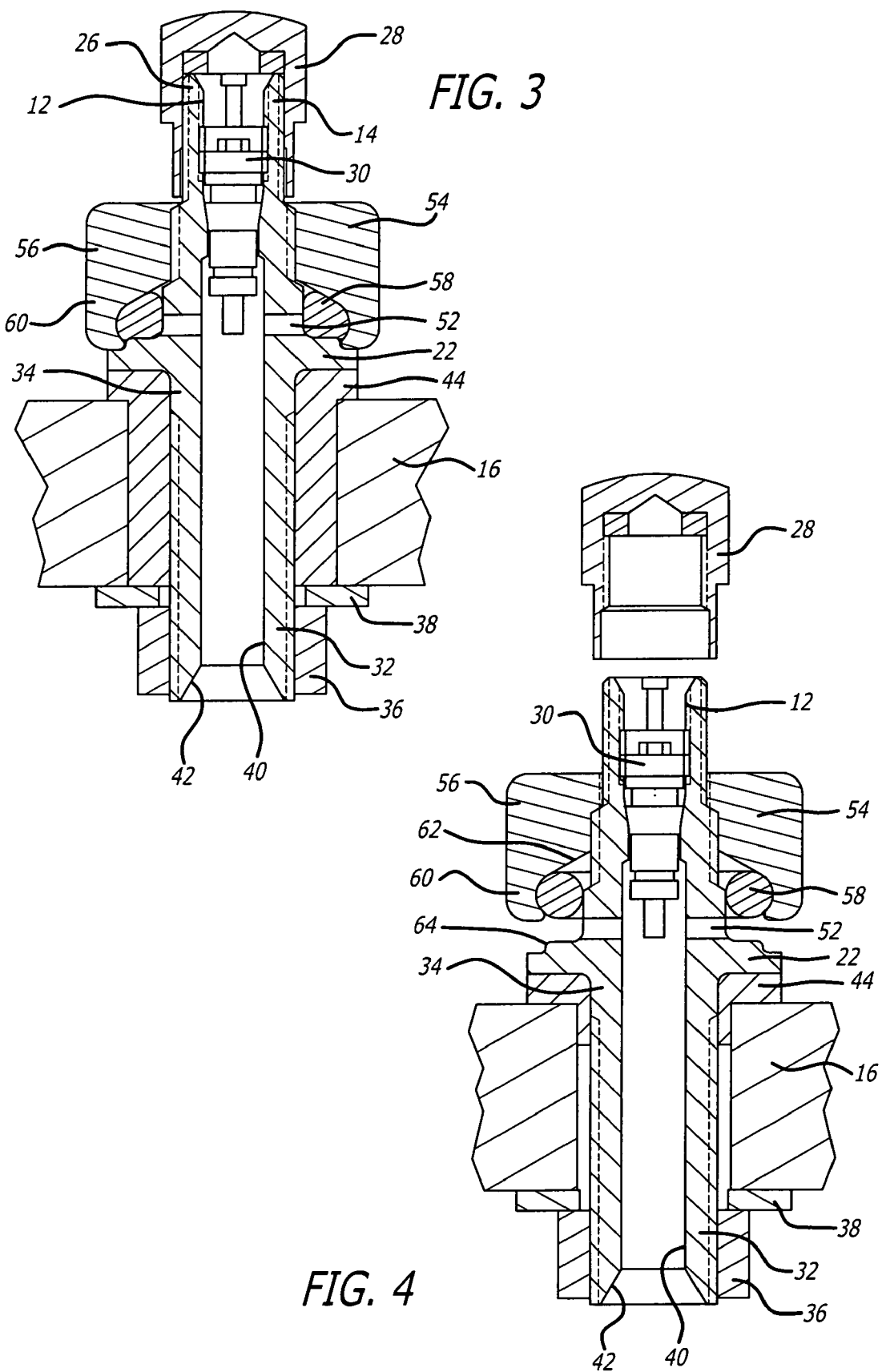
FIG. 3 is an elevational partly-fragmentary partly-sectional view of the system with the openings covered and the cap installed, in an embodiment of the invention.
FIG. 4 is a similar view of the system in FIG. 3 with the openings uncovered and the cap removed, in the practice of the invention.

In the drawings, wherein like reference numerals denote like or corresponding parts throughout the drawing figures, and particularly in the preferred embodiments in accordance with the invention as shown in FIGS. 1–5, for example, a system 10 is provided for enabling the deflation of a tire for reducing tire air pressure. The tire deflation system 10 of the present invention is usable in a tire air valve 12.

The tire air valve 12 includes a valve stem 14 comprising a valve body, which is extendable through a wheel rim 16. The wheel rim 16 includes an outer surface 18 and an inner surface 20. The valve stem 14 includes a flange 22, and an extendable portion which extends from the flange 22, wherein the flange 22 and the extendable portion 24 are extendable outside and adjacent the wheel rim 16. The valve stem 14 also includes an outer portion 26, which extends from the extendable portion 24, and which is threaded on the outside thereof to receive a cap 28 threadably securable thereto. The valve stem 14 further includes an air valve 30 extending therein.

The valve stem 14 also includes an inner portion 32 which is extendable through the wheel rim 16 and protrudes into the volume enclosed by the tire and the wheel rim 16. The valve stem inner portion 32 includes a threaded portion 34 for receiving a nut 36 which is threadably securable thereto, and a washer 38 extending thereabout adjacent the inner surface 20 of the wheel rim 16, for securing the valve stem 14 to the wheel rim inner surface 20. An enlarged bore 40 in the valve stem 14 and a funnel-shaped opening 42 in the threaded portion 34 of the valve stem 14 to enhance air flow. A grommet 44 extends about the inner portion 32 of the valve stem 14 adjacent the wheel rim outer surface 18. The valve stem extendable portion 24 further includes a medial portion 46 from which the outer portion 26 extends. The valve stem medial portion 46 includes an upper threaded portion 48 on the outer surface thereof, and a lower portion 50 positionable adjacent the outer surface 18 of the wheel rim 16.

Referring to FIGS. 1–5, in an embodiment pursuant to the present invention, for example, the tire deflation system 10 includes at least one opening 52, and preferably a plurality of openings 52, formed in the lower portion 50 of the valve stem medial portion 46. The openings 52 may extend for example radially or at an angle in side view and/or in plan view. They are preferably spaced apart circumferentially about the valve stem medial lower portion 50. The tire deflation system 10 further includes an external element 54, which is extendable about the openings 52 in the valve stem medial lower portion 50. The external element 54 is securable in position relative to the valve stem medial portion 46 so as to cover the openings 52, and is moveable so as to partially or fully uncover the openings 52, for enabling metered or rapid deflation of the tire. Threading the cap 28 onto the valve stem 14 assists the external element 54 in further preventing unthreading thereof and unintended release of air pressure.

The external element 54, for example, includes a connecting portion 56 which has an inner upper threaded portion, for enabling the threadable securing thereof to the medial upper threaded portion 48 of the valve stem 14. A compressible member 58 such as an O-ring is positionable between the external element 54 and the openings 52 for enabling the substantial sealing of the openings 52. The external element 54 further includes a portion 60 for retaining the O-ring 58 in position. An angular surface 62 in the external element 54 and a step portion 64 in the flange 22 enable compression of the O-ring 58 so as to substantially seal the openings 52.

As illustrated in FIGS. 1–5, in a method for the use of the preferred embodiment in accordance with the present invention, for example, the system 10 enables the deflation of a tire. The valve stem 14 may be mounted on the wheel rim 16 of the tire by extending the valve stem 14 through the wheel rim 16, threading the nut 36, with the washer 38 adjacent thereto, against the wheel rim inner surface 20, and with the valve stem flange 22 and the grommet 44 bearing against the wheel rim outer surface 18. The threaded connecting portion 56 of the external element 54 may be threadably secured to the medial upper threaded portion 48 of the valve stem 14, such that the O-ring 58 and the retaining covering portion 60 of the external element 54 covers the openings 52. The threaded connecting portion 56 of the external element 54 may be unthreaded partially or fully from the medial upper threaded portion 48 of the valve stem 14, such that the retaining portion 60 of the external element 54 and the O-ring 58 partially or fully uncover the openings 52, enabling air to escape from the tire, dependent upon the extent to which the openings 52 are uncovered, for rapid and controlled deflation of the tire. Air pressure is reduced rapidly by the tire deflation system herein, as contrasted with much longer periods of time with other tire deflation systems and procedures.

The system 10 enables the monitoring of tire pressure during deflation, with commonly available gauges. It may be implemented such that the valve stem 14 protrudes from the outer surface 18 of the wheel rim 16 no further than a standard valve system. It also is relatively lightweight, so as to reduce the need for an additional balancing weight.

In accordance with the present invention, the particular embodiments set forth above for the system 10 are capable of providing rapid and metered deflation of a tire. However, other forms of the system 10 may be utilized with the present invention without departing from the spirit and scope of the invention. For example, a system such as the system 10 may be utilized for enabling the rapid and controlled release of fluid pressure in other applications, as for venting compressed gas vessels. The system 10 may also be implemented as a replacement for an original equipment standard tire air valve, or as an additional air valve along with the original equipment air valve, using a pressure gauge attachable thereto or to the original equipment air valve for measuring the air pressure in the tire and the tire deflation rate. Based on the present disclosure, other constructions and applications are known to one skilled in the art.

In view of the above, it is apparent that the system and method of the preferred embodiments of the present invention enhances substantially the effectiveness of deflating a tire for reducing tire air pressure.

While the present invention has been described in connection with the specific embodiments identified herein, it will be apparent to those skilled in the art that many alternatives, modifications and variations are possible in light of the above description. Accordingly, the invention is intended to embrace all such alternatives, modifications and variations as may fall within the spirit and scope of the invention disclosed herein.

What is claimed is:

1. A system for enabling deflation of a tire, adapted for use in a tire air valve which includes a valve stem which is extendable through a wheel rim, wherein the stem includes an extendable portion which is adapted to be extendable outside and adjacent to the wheel rim, wherein the tire deflation system comprises:

at least one opening, formed in the extendable portion of the valve stem; and an external element, adapted to be extendable about the opening in the extendable portion of the valve stem, and adapted to be secured in position relative to the extendable portion of the valve stem so as to cover the opening, and to be movable so as to uncover the opening for enabling deflation of the tire, wherein the valve stem further includes an outer portion, which extends from the extendable portion, and which is threaded on the outside thereof and adapted to receive a cap threadably securable thereto, and which includes an air valve extending therein.

* * * * *